US006038459A

United States Patent [19]

Searle et al.

[11] Patent Number: 6,038,459

[45] Date of Patent: Mar. 14, 2000

[54] BASE STATION ANTENNA ARRANGEMENT

[75] Inventors: Jeffrey Graham Searle, Brixham; Stuart James Dean, Paignton; Keith Roy Broome, Torquay; Peter John Chrystie, Galmpton; Christopher Richard Cox, East Portlemouth, all of United Kingdom

[73] Assignee: Nortel Networks Corporation, Montreal, Canada

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/989,905

[22] Filed: Dec. 12, 1997

Related U.S. Application Data

[60] Division of application No. 08/805,063, Feb. 24, 1997, abandoned, which is a continuation-in-part of application No. 08/518,170, Aug. 24, 1995, abandoned, which is a division of application No. 08/137,834, Oct. 15, 1993, abandoned.

[30] Foreign Application Priority Data

Oct. 19, 1992 [EP] European Pat. Off. .............. 92309520

[51] Int. Cl.[7] ...................... H04B 1/00

[52] U.S. Cl. ...................... 455/562; 455/507

[58] Field of Search ...................... 455/562, 507, 455/422, 403, 517, 524

[56] References Cited

U.S. PATENT DOCUMENTS

| | | | |
|---|---|---|---|
| 4,025,861 | 5/1977 | Goddard et al. | 320/23 |
| 4,128,740 | 12/1978 | Graziano | 455/277 |
| 4,626,858 | 12/1986 | Copeland | 455/277 |
| 5,039,927 | 8/1991 | Centafanti | 320/2 |
| 5,215,834 | 6/1993 | Reher et al. | 429/62 |
| 5,307,000 | 4/1994 | Podrazhansky et al. | 320/14 |
| 5,581,260 | 12/1996 | Newman | 455/277.2 |
| 5,602,555 | 2/1997 | Searle et al. | 455/507 |
| 5,603,089 | 2/1997 | Searle et al. | 455/507 |
| 5,710,507 | 1/1998 | Rosenbluth et al. | 320/35 |
| 5,717,313 | 2/1998 | Grabon | 320/35 |
| 5,795,664 | 8/1998 | Kelly | 429/7 |
| 5,796,238 | 8/1998 | Hiratsuka et al. | 320/5 |
| 5,871,859 | 2/1999 | Parise | 429/7 |

*Primary Examiner*—Reinhard J. Eisenzopf
*Assistant Examiner*—Marsha D. Banks-Harold
*Attorney, Agent, or Firm*—Lee, Mann, Smith, McWilliams, Sweeney & Ohlson

[57] ABSTRACT

A base station antenna arrangement comprising a plurality of antenna arrays each capable of forming a multiplicity of separate overlapping narrow beams in azimuth, the arrays being positioned such that the totality of beams formed by the arrays provides a substantially omni-directional coverage in azimuth, azimuth and elevation beamforming means for each array, a plurality of r.f. transceivers each for transmitting and receiving r.f. signals for one or more calls, switching matrix means for connecting each transceiver with one or other of the arrays via the beamforming means, control means for controlling the switching matrix means whereby a particular transceiver is connected to a particular array via the beamforming means to exchange r.f. signals with a remote station located in the area covered by one of the narrow beams.

9 Claims, 4 Drawing Sheets

BASE STATION ANTENNA ARRANGEMENT

RELATED APPLICATIONS

This application is a continuation application divided from U.S. patent application Ser. No. 08/805,063 filed on Feb. 24, 1997, now abandoned, which is a continuation-in-part of U.S. patent application Ser. No. 08/518,170, filed Aug. 24, 1995, now abandoned, which is a division of U.S. patent application Ser. No. 08/137,834, filed Oct. 15, 1993, now abandoned, which has been replaced by continuation U.S. patent application Ser. No. 08/531,599, now issued as U.S. Pat. No. 5,603,089 which applications discloses an antenna arrangement which provides a number of beams which radiate in an overlapping fashion to provide coverage over a cell.

FIELD OF THE INVENTION

This invention relates to a base station antenna arrangement for use in a cellular radio communication system.

BACKGROUND OF THE INVENTION

Cellular radio systems are increasing in use throughout the world providing telecommunications to mobile users. In order to meet with capacity demand, within the available frequency band allocation, cellular radio systems divide a geographic area to be covered into cells. At the centre of each cell is a base station, through which the mobile stations communicate. The available communication channels are divided between the cells such that the same group of channels are reused by certain cells. The distance between the reused cells is planned such that co-channel interference is maintained at a tolerable level.

When a cellular radio system is initially deployed, operators are often interested in maximuzing the uplink (mobile station to base station) and downlink (base station to mobile station) range. The range in many systems are uplink limited due to the relatively low transmitted power levels of hand portable mobile stations. Any increase in range means that less cells are required to cover a given geographical area, hence reducing the number of base stations and associated infrastructure costs. Similarly, when a cellular radio system is mature the capacity demand can often increase, especially in cities, to a point where more smaller size cells are needed in order to meet the required capacity per unit area. Any technique which can provide additional capacity without the need for cell-splitting will again reduce the number of base station sites and associated infrastructure costs.

The sectorised approach to the use of directive antennas has reached its useful limit at 60° beamwidth and can go no further. The key disadvantages of this sectorised approach are: the cellular radio transceivers are dedicated to particular sectors which leads to significant levels of trunking inefficiency. In practice this means that many more transceivers are needed at the base station site than for an omni-directional cell of the same capacity, and; each sector is treated by the cellular radio network (i.e. the base station controller and mobile switches) as a separate cell. This means that as the mobile moves between sectors, a considerable interaction is required between the base station and the network to hand off the call between sectors of the same base station. This interaction, comprising signalling and processing at the base station controller and switch, represents a high overhead on the network and reduces capacity.

The antenna used at the base station site can potentially make significant improvements to the range and capacity of a cellular radio system. The ideal base station antenna pattern is a beam of narrow angular width. The narrow beam is directed at the wanted mobile, is narrow in both the azimuth and elevation planes, and tracks the mobiles movements. Within current systems the manner in which directive antennas are used allows relatively small benefits to be obtained. The use of directive antennas, however, in current cellular radio systems, is based on the principle of sectorisation.

U.S. Pat. No. 4,128,740 (Graziano) is typical of many descriptions of cellular communication systems: an array of antennas is provided at each cell site for providing communications to randomly placed transceivers in a given area. Each antenna site has a plurality of sectored antennas for providing a plurality of communication channels. A predetermined number of sites are used to constitute a sub-array of cells to provide a set of communication channels and channel allocations are repeated from subarray to subarray. Channels are allocated per sub-cell so as to minimize channel interference. Each antenna thus is required to subtend an arc of, typically 60° or 120°, depending on the number of antenna arrays employed. Accordingly the transmit and receive electronics must be sufficiently powerful to cope with transmitting and receiving over a wide arc. Such transmit and receive electronics, including the amplifiers are situated at the bottom of the antenna structure.

Multiple narrow beams can be formed in several distinct ways, depending on the structure used to form the basic narrow beam. This can be (a) a reflector, (b) a lens or (c) a phased array antenna. For (a) or (b), an array of feeds is used, with the reflector or lens forming a three-dimensional structure. For (c) a planar structure can be used, and this is highly desirable for a cellular base station, where low profile and low windage are key attributes.

U.S. Pat. No. 4,626,858 (Copeland) provides a system for receiving signals from airborne objects such as telemetry data transmitted during the terminal phase of a re-entry ballistic missile, comprising an array fed aperture, with a Luneberg lens array fed aperture antenna being described. Receive amplifiers only are situated behind the multiple feeds. A large volume is required for the lends, unlike a phased array multiple beam antenna.

With a phased array multiple beam former, transmit and receive amplifiers can be associated with each column of the array. In conventional systems the amplifiers tends to be mounted as discrete components since such amplifiers and associated electronics are liable to fail and (the power amplifiers are the most unreliable part of a cellular site) accordingly a re located in an electronics control cabinet at the base of a mast or building which supports the antennas. If a system fails, then access for repair and the like is relatively straightforward. Typically the power of the transmit amplifiers employed in phased array telecommunications antennas is around 40 watts to cope with transmission losses which occur as signals are sent up the antenna mast or building, from the base station control electronics to the antennas at the masthead. The r.f. feeder cables must be very low loss and become large and expensive.

SUMMARY OF THE INVENTION

According to the present invention there is provided a cellular communications base station arrangement comprising a phased array antenna arrangement capable of forming a number of narrow beams in azimuth and electronic control means, wherein transmit and receive amplifiers are situated proximate to antenna elements of the antenna array, whereby feeder loses between the antenna structure and remote base station control apparatus through transmission lines are minimized.

By providing transmit and receive signal amplification at the masthead, signal deterioration due to masthead to base station control apparatus losses are compensated and accordingly signal quality is improved. In the transmit mode signals are not amplified at the base station control apparatus so that high power feeder losses that occur from the base station control to the antenna prior to transmission need not be taken into account, whilst in the receive mode, the loss of low level signals which are received from the antenna cannot occur, since they are mplified before decaying below the lower detection limit upon transmission from the masthead to the base station control apparatus. Furthermore, the amplifiers amplify signals transmitted to and received from the narrow multiple beams and do not require the high power amplification as required by known 60° and 120° sectored arrangements.

The positioning of the linear power amplifiers between the transmit azimuth beamformer and the diplexers provides an excellent compromise between the above factors and cost. If a complete linear power amplifier were to fail (which is unlikely because of their highly redundant design) the main effect would be a slight degradation in the sidelobe level of the beam patters. If, by comparison, the linear power amplifiers had been placed at the input to the transmit azimuth beamformer a failure would mean the loss of an entire beam and the corresponding loss of coverage within the cell. Because the linear power amplifiers are distributed, one for each elevation beamformer, this means that the power of each amplifier is relatively small, the final combination being done in space by the antenna array. The low power of operation of the linear power amplifiers allows the intermodulation requirements to be met.

In accordance with another aspect of the invention, there is provided a cellular communications base station arrangement comprising a phased array antenna structure comprising columnar arrays of antenna elements arranged in rows to form a number of narrow beams in azimuth, beamformer means and a remote base station control apparatus, wherein each column of elements is energised via an elevation beamformer means which couples the antenna elements of a column to a single feed point, wherein transmit and receive signals for each elevation beamformer are coupled to the beamformer via individual diplexers, which diplexers in the transmit path are fed from separate linear power amplifiers for each elevation beamformer, and which diplexers in the receive path feed separate substantially identical low noise amplifiers, the inputs of the transmit amplifiers receiving signals from transmit azimuth beamformers and the outputs of the receive amplifiers being connected to receive azimuth beamformers, one for each array, whereby the phase and amplitude relationship of the outputs to the beamformers control the azimuth beam pattern from the array, wherein the transmit and receive amplifiers are situated proximate to antenna elements of the antenna array, whereby feeder losses between the antenna structure and the remote base station control apparatus through transmission lines are minimized.

Preferably, in the transmit path, the diplexers are fed from separate linear power amplifiers, one for each elevation beamformer whereby the r.f. signals are amplified up to the power levels required for transmission, the power amplifiers having a high linearity whereby the signals from every transmitter pass through the amplifiers simultaneously without producing significant intermodulation products.

Preferably, in the receive path, the diplexers feed separate substantially identical low noise amplifiers, one for each elevation beamformer, the low noise amplifiers amplifying the weak received r.f. signals prior to any system losses to establish a low noise figure in the subsequent receive path.

In accordance with another aspect of the inventions, there is provided a method of operating a cellular communications system in a transmit mode, the system including a base station comprising a phased array antenna arrangement capable of forming a number of narrow beams in azimuth and including transmit amplifiers situated proximate to antenna elements of the antenna array;

the method comprising the steps of:

i) transmitting low power r.f. signals to the antenna arrays;

ii) amplifying the low power r.f. signals proximate the antenna elements; and iii) feeding the amplified r.f. signals to the antenna elements;

whereby r.f. feeder losses from the base station control apparatus are minimized.

In accordance with another aspect of the invention, there is provided a method of operating a cellular communications system in a receive mode, the system including a base station comprising a phased array antenna arrangement capable of forming a number of narrow beams in azimuth and including receive low noise amplifiers situated proximate to antenna elements of the antenna arrangement;

the method comprising the steps of:

i) receiving low power r.f. signals from an antenna array;

ii) amplifying the low power r.f. signals within the antenna arrangement; and iii) transmitting the amplified r.f. signals to the base station control apparatus;

whereby the weak received r.f. signals are amplified prior to any system losses to establish a low noise figure in the subsequent receive path to a remote base station control.

BRIEF DESCRIPTION OF THE DRAWINGS

Embodiments of the invention will now be described with reference to the accompanying drawings, in which.

DESCRIPTION OF THE PREFERRED EMBODIMENTS

Figure 1:
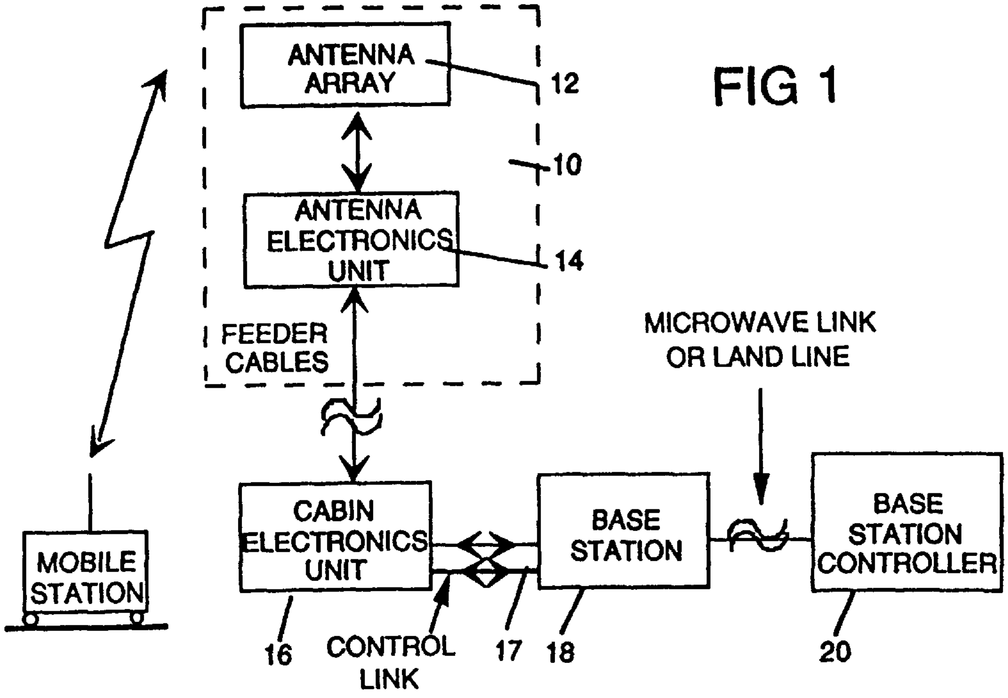
FIG. 1 is a block diagram of the main elements of a base station.

The main elements of a telecommunications base station antenna arrangement as shown in FIG. 1 comprise a mast tower or building 10 supporting the antenna array(s) 12 and associated antenna electronics unit 14, which includes beamformers, diplexers and amplifiers. The antenna electronic unit 14 is connected via a cabin electronics unit 16 to the base station 18 which is under the control of a base station controller 20.

Figure 2A:
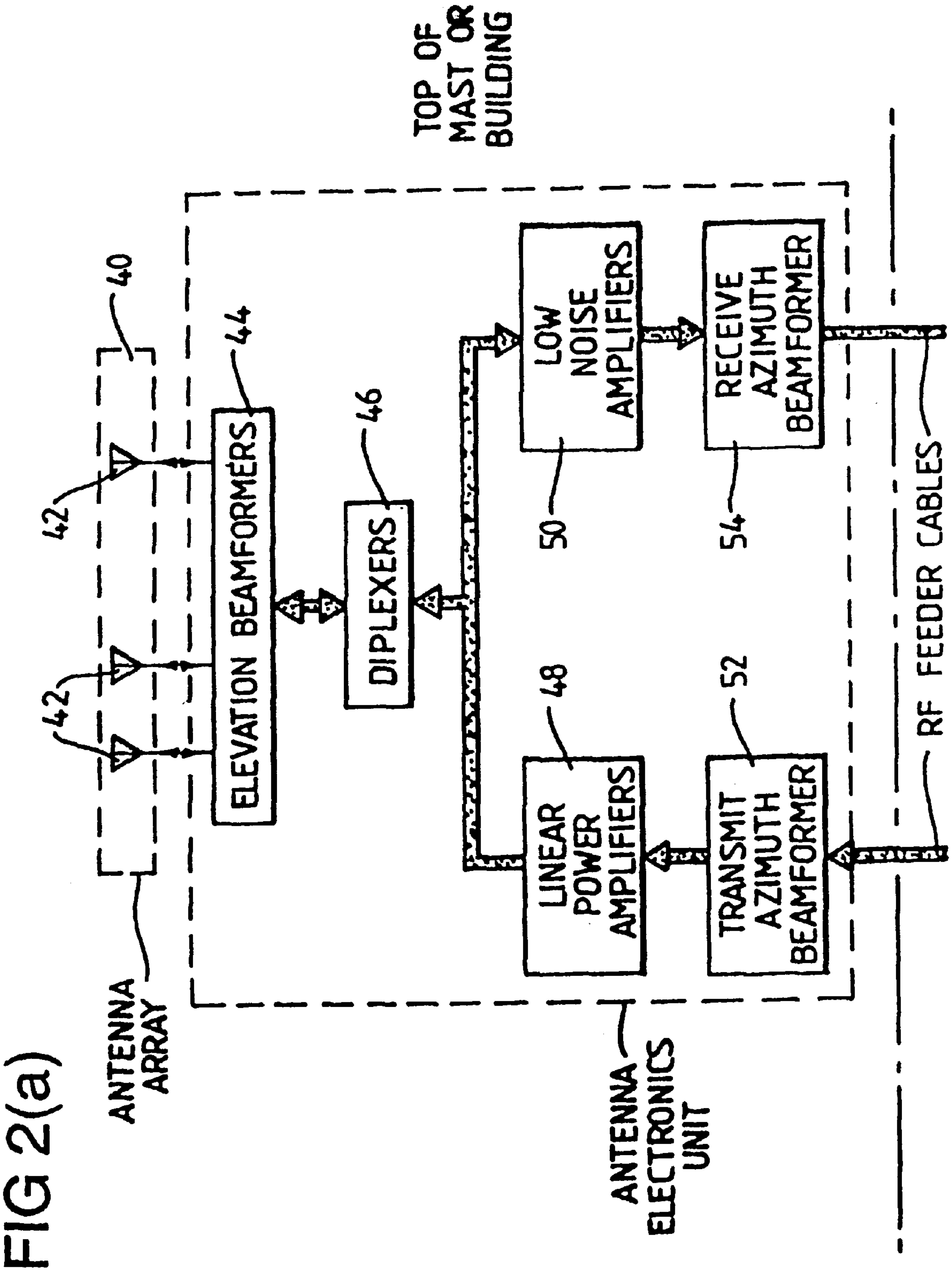
FIGS. 2(*a*0 and 2(*b*0 show the constituents of a multiple narrow beam base station.
Figure 2B:
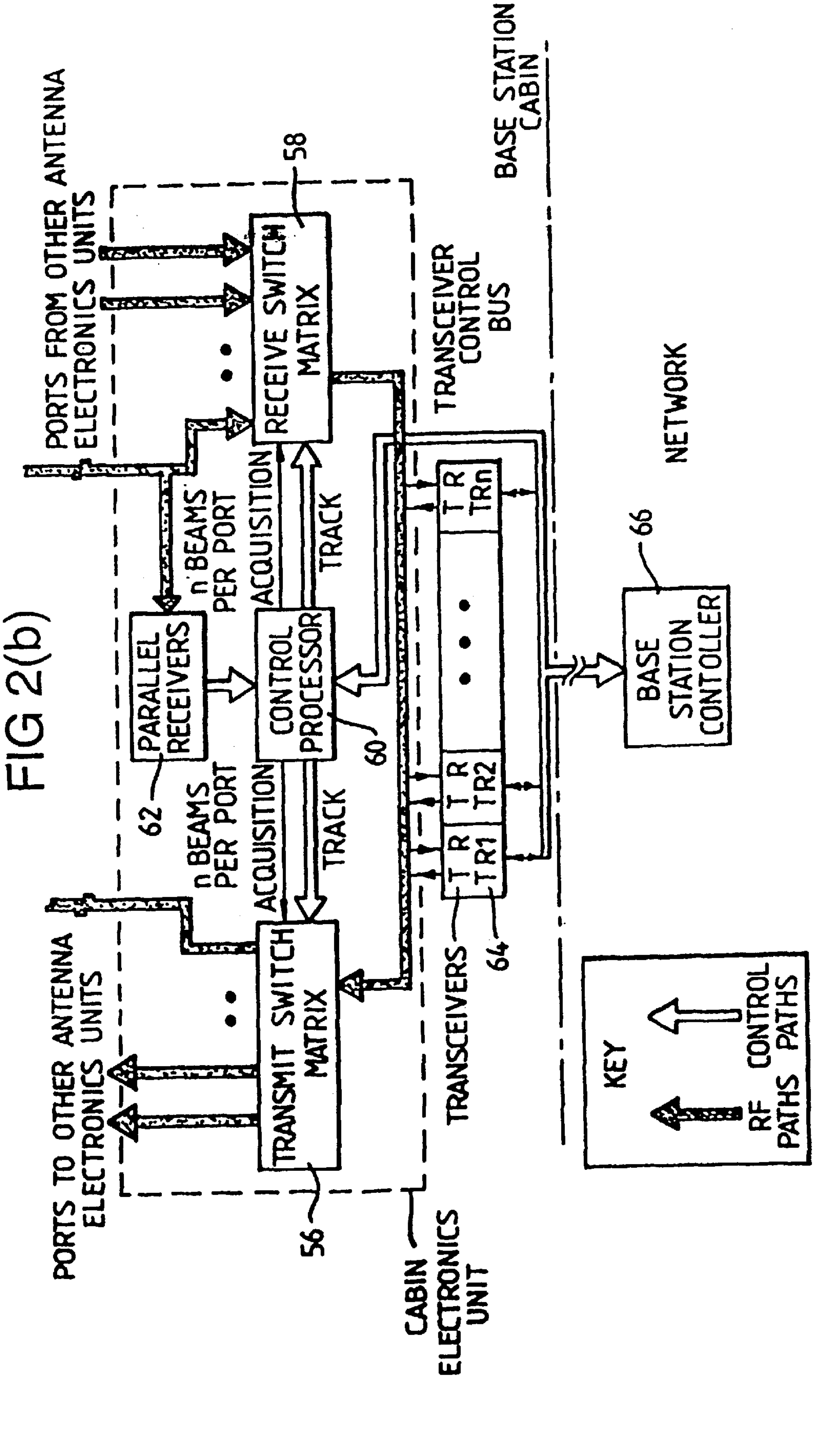

The detailed constituents of the base station antenna arrangement are shown in FIGS. 2(*a*) and 2(*b*). Only one of the antenna arrays is depicted. Each antenna array 40 comprises an array of individual antenna elements 42 arranged in rows and columns. Each column of elements is energised via an elevation beamforming network 44. Each elevation beamforming network combines the elements of a column to a single feed point. The amplitude and phase relationships of the r.f. signals coupled to the elevation beamformer determine the elevation beam pattern of the antenna for both transmit and receive. The transmit and receive signals for each elevation beamformer are coupled to the beamformer via individual diplexers 46. Filters which cover just the transmit or receive frequency bands respectively can be used for this purpose. In the transmit path the diplexers 46 are fed from separate linear power amplifiers 48, one for each elevation beamformer. These amplify the r.f. signals up to the power levels required for transmission. The power amplifiers need to have high linearity since the signals from every transmitter pass through the amplifiers simultaneously without producing significant intermodulation products. In the receive path the diplexers 46 feed separate substantially identical low noise amplifiers 50, one for each elevation beamformer. The low noise amplifiers are required to amplify the weak received r.f. signals prior to any system losses to establish a low noise figure (high sensitivity) in the subsequent receive path.

The linear power amplifiers are in turn connected to the outputs of azimuth beamformers 52, one for each array. The azimuth beamformers have multiple output ports, one for each elevation beamformer, via the relevant linear power amplifier. The phase and amplitude relationship of the outputs to the beamformers control the azimuth beam pattern from the array. The beamformer has multiple input ports each of which provides a different azimuth beam in space. Likewise the receive path has a corresponding azimuth beamformer 54 for each array. This combines the multiple inputs from the elevation beamformers via the low noise amplifiers to provide multiple outputs each for a different azimuth beam in space. The phase and amplitude relationships used in the combination process control the azimuth beam shapes. The transmit and receive azimuth beamformers are substantially identical circuits used in a reciprocal manner. One well known type of beamformer is the Butler matrix.

Figure 3:
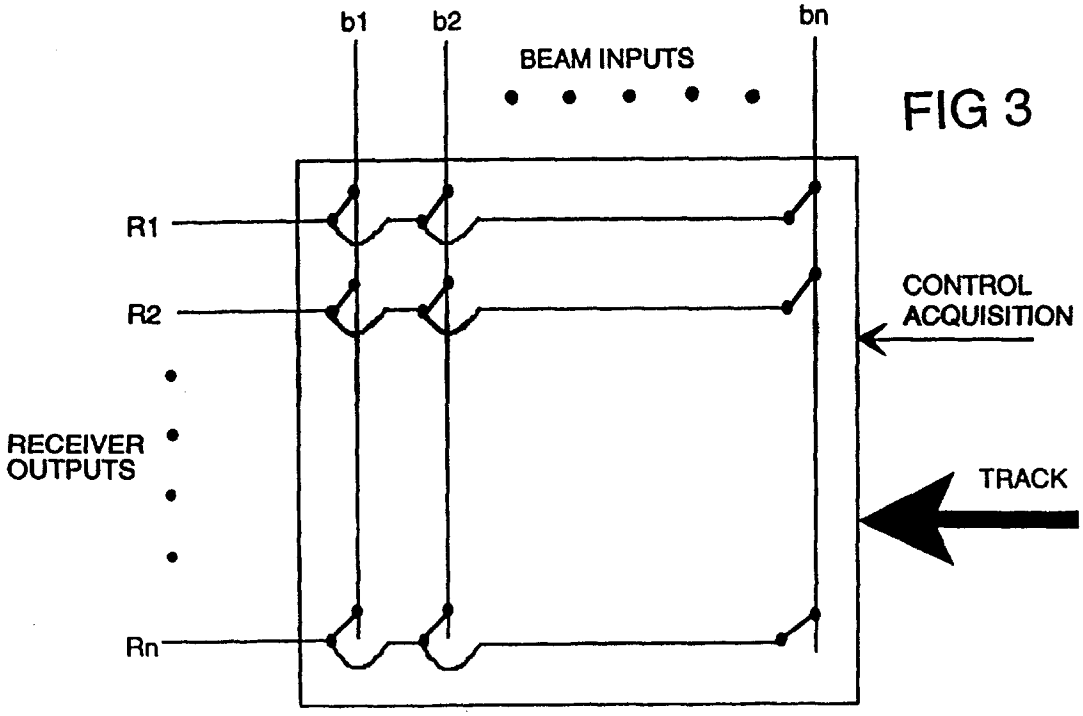
FIG. 3 illustrates the basic principle of a switching matrix.

Signals are passed to and from the azimuth beamformers by transmit and receive switch matrices 56 and 58. Each switch matrix comprises an r.f. cross-bar switch which allows any of its inputs to be connected to any of its outputs. The switch matrix design is such that any number of transmitters or receivers can be connected simultaneously to any one beamformer port. Thus, if necessary, all the transmitters can be connected to one beam port at a given time. Likewise all the receivers can be connected, if necessary, to the same beam port at the same time. The switch matrices are operated under the control of a control processor 60. A typical switch matrix structure is illustrated in FIG. 3. A bank of parallel receivers 62, one for each beam, allow every receive channel to be monitored on every beam simultaneously. For each channel the receivers measure the quality of the wanted mobile station signal present on each beam. The information on which is the 'best' beam is passed to the control processor. The quality measure used by the receivers will vary depending on the particular cellular system concerned. In simple, cases the measure will be the highest power level in other cases carrier to interference ratio will be used. The basic function of the control processor 60 is to control the transmit and receive switch matrices such that the best beam (normally the one pointing at the mobile stations geographic position) for a given channel is selected. The inputs to the control processor are the beam quality data from the parallel receivers and in some cases data from the transceiver control bus within the base station. The latter allows the control processor to monitor a given mobile station's assignment to various control and traffic channels in the system during the progress of a call. Knowledge of which channel the mobile is being moved to allow a prompt and non-disruptive assignment to the best beam. The control algorithms used will fall into two basic classes, one for initial acquisition of the best beam for a new call and one for tracking of the best beam when a call is in progress. It is anticipated that due to different multipath conditions the parameters within the control algorithms will vary for rural and urban cells. The determination of beam selection on the uplink is used to select the corresponding beam for the downlink. The switch matrices are coupled by r.f. bus paths to the bank of transceivers 64, one for each channel to be provided by the base station. The transceivers are operated under the control of the base station controller 66, which also provides overall control for the switch matrix control processor 60.

Considered from the network viewpoint, the narrow beam antenna system appears as an omni-directional cell site. Since any transceiver can be switched to any beam and hence look in any direction, there are no sectors. Thus, within the network all signalling and processing associated with sector to sector hand-offs is eliminated. Also the fact that transceivers can be used in any direction eliminates the trunking inefficiency of sectorised sites. These factors not only eliminate a significant load from the network but allow the antenna system to utilise effectively narrower beamwidths than would otherwise be possible.

The position of the amplifiers 48, 59 at the top of the mast or building will now be discussed. Firstly the concept of switching the transmitter to any beam is impractical unless it can be achieved without generating intermodulation products, or at least maintaining them at a very low level. This is not possible if one were to attempt to switch the power levels, which can be as high as 5 watts, at the transceiver outputs. It is necessary to switch before power amplification. Secondly if power amplification takes place at the foot of the mast or building, the r.f. feeder cables must be very low loss and become large and expensive. This would be a significant practical limitation on the number of beams one could have in a system.

By situating the amplifiers at the top of the mast or building the above problems are solved. However, the precise position in the architecture within the antenna electronics unit is still critical. Other factors which must be taken into account are that since the individual amplifiers now pass the signals from all transmitters simultaneously, intermodulation products must once again be at a very low level. Also since the amplifiers are at the top of the mast they must be extremely reliable and failures should produce gradual rather than catastrophic degradation in system performance.

The positioning of the linear power amplifiers 48 between the transmit azimuth beamformer 52 and the diplexers 46 provides an excellent compromise between the above factors and cost. If a complete linear power amplifier were to fail (which is unlikely because of their highly redundant design) the main effect would be a slight degradation in the sidelobe level of the beam patterns. If, by comparison, the linear power amplifiers had been placed at the input to the transmit azimuth beamformer a failure would mean the loss of an entire beam and the corresponding loss of coverage within the cell. Because the linear power amplifiers are distributed, one for each elevation beamformer, this means that the power of each amplifier is relatively small, the final combination being done in space by the antenna array 40. The low power of operation of the linear power amplifiers allows the intermodulation requirements to be met. Still lower power of operation could be achieved if the linear power amplifiers were placed on each antenna element. Whilst this in itself would be practical the necessary diplexer per antenna element would not be.

A potential disadvantage of the invention is that a relatively large antenna aperture, in terms of wavelengths, is needed to produce the narrow beams. If the antenna paerture were very large this could create aesthetic and structural problems, due to wind loading etc., in some sites. This potential disadvantage is overcome by using the same antenna array 40 for transmit and receive. In this way the outline of the antenna, for reasonable beamwidth, is less than that of many conventional cell sites.

Figure 4:
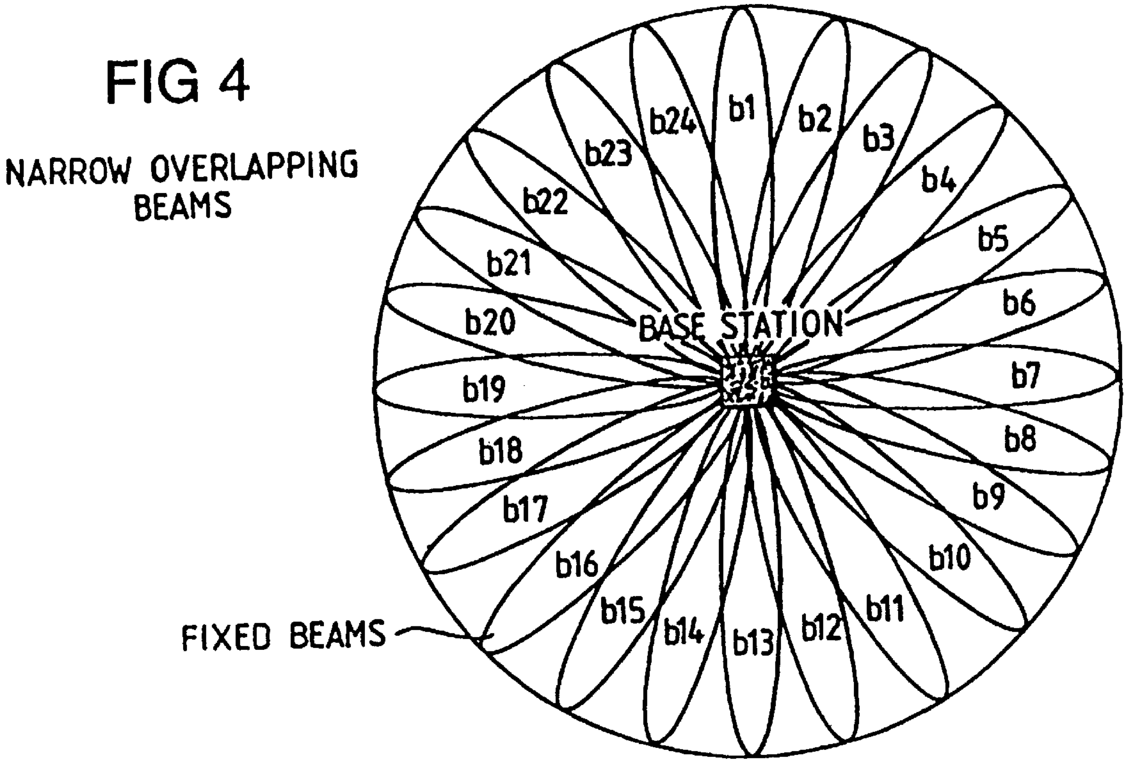
FIG. 4 shows the concept of a multiplicity of narrow, overlapping beams covering the cell area surrounding the base station.
Figure 5:
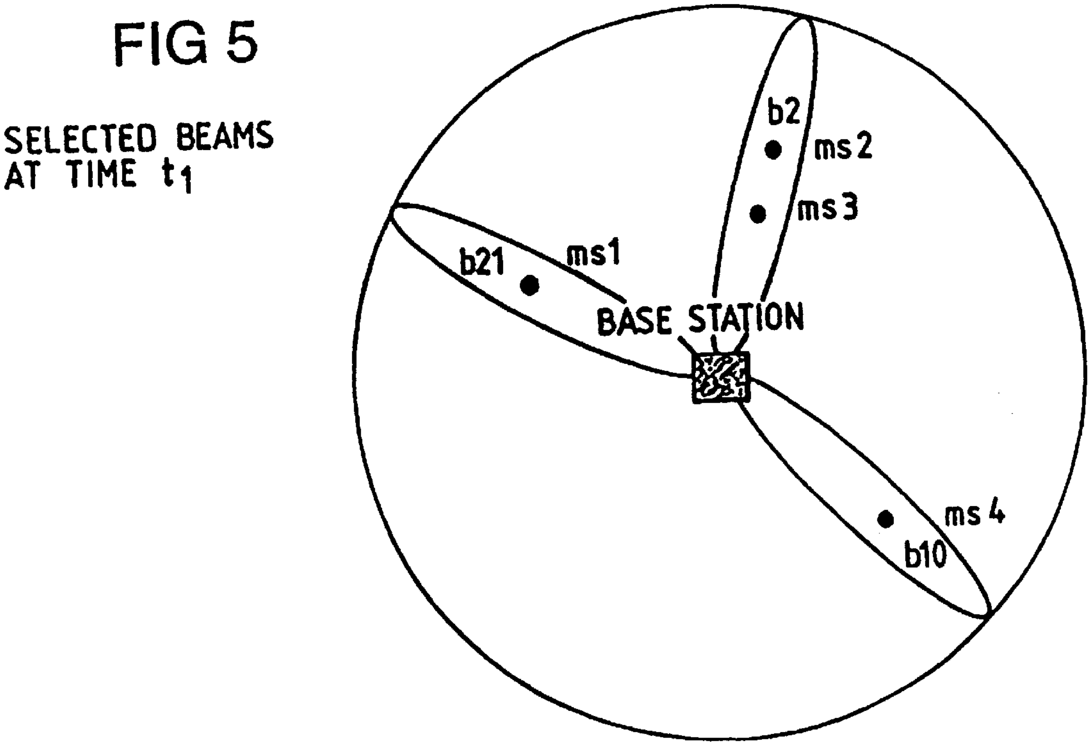
FIG. 5 shows how mobile stations are served by the narrow beams.

FIGS. 4 and 5 illustrate the system operation. FIG. 4 shows the concept of a multiplicity of narrow, overlapping beams covering the cell area surrounding the base station. The beams are referenced b1–b24. FIG. 5 shows how, at time $t_1$ four mobile stations ms1–ms4 are served by beams b2, b10 and b21. Beam b2 serves two mobile stations ms2 and ms3 at this time. As the mobile stations move geographically in relation to the base station, at time $t_2$ beam b22 now serves mobile stations ms1, b4 serves ms3 and b8 serves ms4. Mobile station ms2 has, at time $t_2$ moved out of the cell coverage of this base station and will now be served by an adjoining base station (not shown).

We claim:

1. A base station antenna arrangement comprising:

a plurality of antennas arrays, wherein each antenna array is capable of forming separate overlapping narrow beams in azimuth, a plurality of r.f. transceivers each for transmitting and receiving r.f. signals for one or more calls, and switching matrix means and control means operable to switch each transceiver through the switching matrix means to any array whereby r.f. call signals can be exchanged between any transceiver and a mobile station located in any area covered by the narrow beams.

2. An arrangement according to claim 1 wherein transmission and reception are effected through a common antenna aperture.

3. An arrangement according to claim 1 further comprising means for monitoring the beam quality of each receive channel on every beam, the switch matrix control means being responsive to the beam monitoring means to control switching of calls during the progress of said calls.

4. An arrangement according to claim 1 wherein the antenna arrays comprise rows and columns of antenna elements, each array being provided with separate elevation beamforming means for each column of elements and separate transmit and receive azimuth beamforming means being coupled to all the elevation beamforming means via diplexer means.

5. An arrangement according to claim 4 wherein the amplifying means are situated between the azimuth beamforming means and the diplexer means.

6. An arrangement according to claim 1 further comprising separate amplifying means for each beam.

7. An arrangement according to claim 1 wherein the switching matrix means comprises transmit and receive r.f. cross-bar switches.

8. A method of operating a base station arrangement comprising:

a plurality of antenna arrays, wherein each antenna array is capable of forming separate overlapping narrow beams in azimuth;

a plurality of r.f. transceivers each for transmitting and receiving r.f. signals for one or more calls, and switching matrix means and control means;

the method comprising:

operating the control means to switch each transceiver through the switching matrix means to any array whereby r.f. call signals can be exchange between any transceiver and a mobile station located in any area covered by the narrow beams.

9. A method as claimed in claim 8 further comprising:

for a given signal received for a mobile, determining the best beam to be selected on the uplink by measuring the quality of the received signal strength from the mobile;

selecting the antenna array which would provide the best beam for a given channel on the downlink;

transmitting a signal from a transceiver, through a transmit switch matrix and through the selected antenna array, to the mobile.

* * * * *